(12) United States Patent
Tesch et al.

(10) Patent No.: US 8,667,569 B2
(45) Date of Patent: Mar. 4, 2014

(54) CREDENTIALS MANAGEMENT (75) Inventors: Aaron T. Tesch, Lonsdale, MN (US); James R. Nelson, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 43 days.

(21) Appl. No.: 13/248,954

(22) Filed: Sep. 29, 2011

(65) Prior Publication Data

US 2013/0086388 A1 Apr. 4, 2013

(51) Int. Cl.
H04L 29/06 (2006.01)

(52) U.S. Cl.
USPC .................. 726/6; 726/5; 713/182; 707/698

(58) Field of Classification Search
None
See application file for complete search history.

(56) References Cited

U.S. PATENT DOCUMENTS

| | | | |
|---|---|---|---|
| 5,719,941 A | 2/1998 | Swift et al. | |
| 6,370,649 B1 | 4/2002 | Angelo et al. | |
| 6,513,047 B1 * | 1/2003 | Talley | 707/803 |
| 7,191,466 B1 * | 3/2007 | Hamid et al. | 726/3 |
| 7,430,590 B1 * | 9/2008 | Rive et al. | 709/220 |
| 2001/0032310 A1 | 10/2001 | Corella | |
| 2002/0029341 A1 | 3/2002 | Juels et al. | |
| 2002/0095567 A1 | 7/2002 | Royer et al. | |
| 2003/0046572 A1 | 3/2003 | Newman et al. | |
| 2003/0140051 A1 * | 7/2003 | Fujiwara et al. | 707/100 |
| 2004/0158708 A1 | 8/2004 | Peyravian et al. | |
| 2005/0108579 A1 * | 5/2005 | Isaacson et al. | 713/202 |
| 2005/0144440 A1 | 6/2005 | Catherman et al. | |
| 2005/0166263 A1 | 7/2005 | Nanopoulos et al. | |
| 2006/0037066 A1 * | 2/2006 | Audebert | 726/5 |
| 2006/0041786 A1 * | 2/2006 | Janakiraman et al. | 714/13 |
| 2006/0089919 A1 | 4/2006 | Kidd et al. | |
| 2006/0200665 A1 * | 9/2006 | Olson et al. | 713/167 |
| 2006/0248524 A1 * | 11/2006 | Seely | 717/174 |
| 2007/0061803 A1 * | 3/2007 | Barrett | 717/178 |
| 2007/0124807 A1 * | 5/2007 | Jau | 726/6 |
| 2007/0136800 A1 | 6/2007 | Chan et al. | |
| 2007/0283317 A1 * | 12/2007 | Sadler et al. | 717/103 |
| 2008/0059799 A1 | 3/2008 | Scarlata | |
| 2009/0196285 A1 * | 8/2009 | Smires et al. | 370/352 |
| 2009/0240943 A1 | 9/2009 | Brown et al. | |
| 2011/0202756 A1 * | 8/2011 | West | 713/152 |
| 2011/0265160 A1 * | 10/2011 | Nettleton | 726/6 |
| 2011/0314290 A1 * | 12/2011 | Fort et al. | 713/176 |
| 2012/0158920 A1 * | 6/2012 | Yang | 709/220 |

FOREIGN PATENT DOCUMENTS

WO 2009/110878 9/2009

OTHER PUBLICATIONS

Ferrie, Peter, "Inside the Microsoft Script Encoder," Virus Bulletin, Jan. 2006, p. 4-5.
Rosales, Francisco, "Manpage for shc(1)," http://www.datsi.fi.upm.es/~frosal/sources/shc.html, retrieved Apr. 25, 2011.

(Continued)

*Primary Examiner* — Farid Homayounmehr
*Assistant Examiner* — Henry Tsang
(74) *Attorney, Agent, or Firm* — Nixon & Vanderhye P.C.

(57) ABSTRACT

An encrypted file is decrypted to gain access to a stored hash value for a credentials setting component. A test hash value of the credentials setting component is formed. Before decrypting a set of encrypted credentials to form decrypted credentials, it is required that the test hash value of the credentials setting component match the stored hash value of the credentials setting component. The decrypted credentials are then passed to the credentials setting component to set credentials that instructions are to be executed under.

19 Claims, 9 Drawing Sheets

(56) References Cited

OTHER PUBLICATIONS

Quest Software, Inc., "Thread: Running a powershell script with different user credentials," http://powergui.org/thread.jspa?messageID=46393, Nov. 2010.

Cyber-Ark, "Securing Application Credentials," Application Identity Management Solution from Cyber-Ark, http://www.cyber-ark.com/identity-access-managment-solutions/application-identities.asp, retrieved May 13, 2011.

Microsoft, "Validate user credentials and group membership before executing the script," http://social.technet.microsoft.com/Forums/en-US/winserverpowershell/thread/29546e31-7cal-466a-9bfc-f527ed7b1cc0, Jul. 2010.

Microsoft, "Providing User Credentials in a Script," http://technet.microsoft.com/en-us/library/cc764264(printer).aspx, Oct. 21, 2008.

\* cited by examiner

```
<?xml version="1.0" encoding="utf-8"?>
<Instruction>
    <CommandBlock>
        <CommandPath>argWriter.exe</CommandPath>
        <CommandHash>SLJIx5shp8WEvWsobiroROmb3jxUYz3cfHbxfLmXZSM=
        </CommandHash>
        <Arguments>cscript CMCUtil.vbs setup
                w3svc/AppPools/Instruction:ObjectName/WamUserName
                "cred:domainName\cred:UserName"
                w3svc/AppPools/Instruction:ObjectName/WamUserPass
                "cred:password"
        </Arguments>
    </CommandBlock>
    <ScriptBlock></ScriptBlock>
    <ObjectCredential>ID4</ObjectCredential>
    <ValidEndpoints>
        <Endpoint>
            POS
        </Endpoint>
    </ValidEndpoints>
    <AsUserCredential></AsUserCredential>
</Instruction>
```

FIG. 3

```
<?xml version="1.0" encoding="utf-8" ?>
<Instruction>
    <CommandBlock></CommandBlock>
    <ScriptBlock>
        <Shell>
            <Extension>cmd</Extension>
            <Path>C:\WINDOWS\system32\cmd.exe</Path>
        </Shell>
        <Script>
        SET Domain=%1
        SET UserName=%2
        SET Password=%3
        C:\windows\system32\cscript.exe %SYSTEMDRIVE%\Inetpub\AdminScripts\ADSUTIL.VBS SET w3svc/1/root/Instruction:Object %Domain%\%UserName% %Password%
        </Script>
        <ScriptPath></ScriptPath>
        <ScriptHash>SLJlx5shp8WEvWsobiroROmb3jxUYz3efHbxfLmXZSM=</ScriptHash>
    </ScriptBlock>
    <ObjectCredential>ID4</ObjectCredential>
    <ValidEndpoints>
        <Endpoint>POS</Endpoint>
    </ValidEndpoints>
    <AsUserCredential></AsUserCredential>
</Instruction>
```

FIG. 4

```xml
<?xml version="1.0" encoding="utf-8"?>
<Instruction>
  <CommandBlock>
    <CommandPath>c:\service\auto.exe</CommandPath>
    <CommandHash>SLJIx5shp8WEvWsobiroROmb3jxUYz3efHbxfLmXZSM=</CommandHash>
    <Arguments>
      c:\apps\tools\autologon.exe ObjectCredential:Domain
      ObjectCredential:Name ObjectCredential:Password
    </Arguments>
  </CommandBlock>
  <ScriptBlock>
  </ScriptBlock>
  <ObjectCredential>ID4</ObjectCredential>
  <ValidEndpoints>
    <Endpoint>
    POS
    </Endpoint>
  </ValidEndpoints>
  <AsUserCredential></AsUserCredential>
</Instruction>
```

FIG. 5

```
<?xml version="1.0" encoding="utf-8" ?>
<Instruction type="service">
    <CommandBlock>                                    ← 650
        <CommandPath>c:\service\sc.exe</CommandPath>
        <CommandHash>SLJIx5shp8WEvWsobiroROmb3jxUYz3efHbxfLmXZSM=</CommandHash>
        <Arguments>
            config Instruction:ObjectName obj=
                ObjectCredential:Domain\ObjectCredential:Name password=
                ObjectCredential:Password
        </Arguments>
    </CommandBlock>                                   ← 650
    <ScriptBlock></ScriptBlock>
    <ObjectCredential>ISP-Service</ObjectCredential>
    <ValidEndpoints>
        <Endpoint>
        ISP
        </Endpoint>
    </ValidEndpoints>
    <AsUserCredential>ISP-Installer</AsUserCredential>
</Instruction>
```

(600) ← Instruction root, CommandBlock
(602) ← CommandPath, CommandHash
(604) ← Arguments content
(612) ← ObjectCredential
(618) ← ValidEndpoints
(616) ← AsUserCredential

CREDENTIALS MANAGEMENT

BACKGROUND

In computer systems, utility computer applications and scripts are used to automate tasks that would otherwise require users to perform a large number of steps. For example, utility applications can be used to collect changes in a large database and forward the changes to a central server.

In order to protect data and applications, computer systems typically employ some form of security that requires each user to provide a user ID and a password before the system will grant access to the data and/or applications. The user ID and password are referred to as credentials. To reduce the amount of harm that can occur if a user ID and password are compromised, many systems require that passwords be changed on a periodic basis such as once every seventy-five days. This is referred to as password rotation.

In systems that require credentials, local services, remote services and web services (referred to generically as services) must be run under a valid set of credentials. Typically, this is done by creating special user ID(s) for running the services and assigning a password to each special user ID. The special user ID and password are then written into a utility application or a script that calls a credential setting service that sets the credentials that one or more other services will run under. There are several possible credential setting services such as Auto Logon, Service Control (sc), Virtual Directory, and scripts that set the identity of an Application Pool.

If the user ID and password are written into an application, the application must be changed and recompiled each time the password changes. When there are a large number of applications, this becomes extremely time consuming.

If the user ID and password are written into a script, the script does not need to be recompiled when the user ID and password are changed. However, the user ID and password are present in plain text form in the script and anyone who can gain access to the script can acquire the user ID and password.

The discussion above is merely provided for general background information and is not intended to be used as an aid in determining the scope of the claimed subject matter. The claimed subject matter is not limited to implementations that solve any or all disadvantages noted in the background.

SUMMARY

An encrypted file is decrypted to gain access to a stored hash value for a credentials setting component. A test hash value of the credentials setting component is formed. Before decrypting a set of encrypted credentials to form decrypted credentials, it is required that the test hash value of the credentials setting component match the stored hash value of the credentials setting component. The decrypted credentials are then passed to the credentials setting component to set credentials that instructions are to be executed under.

According to other embodiments, a credentials management client decrypts an encrypted file to identify a name of an encrypted credentials file. The credentials management client verifies that a credentials setting component has not been modified and decrypts the encrypted credentials file to obtain a password. The credentials management client provides a user ID and the password to the credentials setting component, which sets the credentials under which instructions may be executed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 2-1, 2-2, and 2-3 are a lane diagram showing the execution flow of the system of FIG. 1.

DETAILED DESCRIPTION

The embodiments described below allow instructions to be executed by a processor under a set of credentials that are not written into a compiled executable application and that are not exposed as plain text in a script. The credentials are stored in an encrypted form and may be changed as desired, Further, at least some of the embodiments ensure that instructions that call a credentials setting service have not been modified before decrypting the credentials that the set of instructions will be run under.

Figure 1:
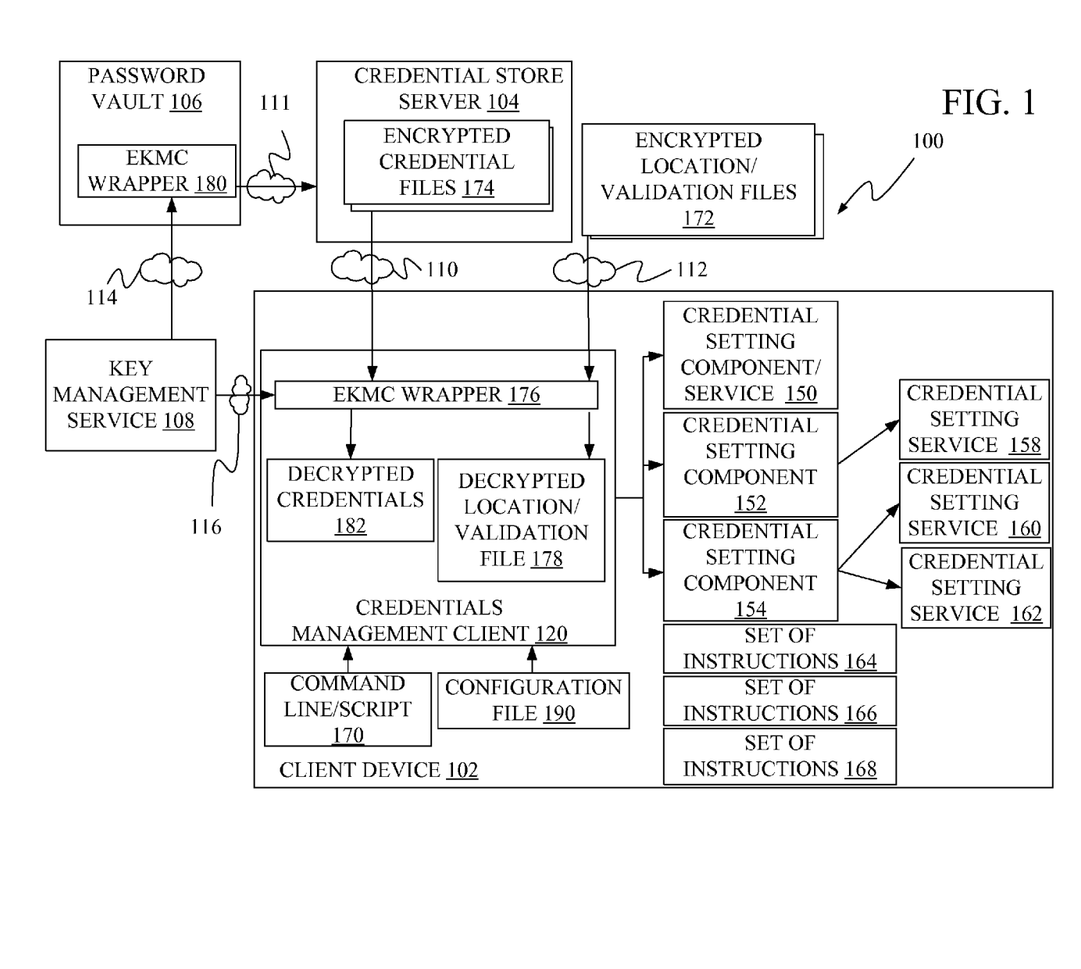
FIG. 1 is a block diagram of a system used to execute instructions under credentials, according to one embodiment.

FIG. 1 provides a block diagram of a system 100 and FIGS. 2-1, 2-2 and 2-3 are lane diagrams showing the execution flow of system 100. System 100 includes client device 102, credential store server 104, password vault server 106, and key management service server 108. Client device 102, credential store server 104, password vault server 106, and key management service server 108 may be implemented on a single computing device or may be distributed across multiple computing devices. In embodiments where client device 102, credential store server 104, password vault server 106, and key management service server 108 are distributed across multiple computing devices they may be connected by one or more network connections including local area networks, wide area networks, an intranet and/or the Internet. In FIG. 1, network connections 110, 112, 114 and 116 are shown between the various elements. Communication along these network connections may be made using an appropriate communication protocol. For example, to maintain security, communication with key management service server 108 should be made using a secure communication protocol such as a Secure Socket Layer (SSL) of the HTTP protocol.

Client device 102 may be any number of computing devices including an In Store Processor, a Point of Sale system, a workstation, a mobile device, or a register. Client device 102 includes at least one storage device (discussed further below) having stored thereon a credentials management client 120, credentials setting components 152, and 154, credentials setting services 156, 158, 160 and 162, credential setting component/service 150 and executable instructions 164, 166, and 168.

Each of executable instructions 164, 166 and 168 is a set of instructions that is to be run under a set of credentials. Although three executable instruction sets are shown in FIG. 1, any number of executable instruction sets may be present on client device 102. In addition, the executable instruction sets do not have to be stored on client device 102 but may instead be stored on a separate computing device that client device 102 can access.

Credentials setting services 158, 160 and 162 are services provided by an operating system or by another collection of programs that set the user ID and password that instructions are to be run under. Examples of such credentials setting services include Auto Logon, Service Controller (sc.exe), and scripts that change the identity of an Application Pool or a Virtual Directory. Although three credentials setting services are shown in FIG. 1, those skilled in the art will recognize that embodiments described herein can be implemented with any number of credentials setting services as long as there is at least one credentials setting service. Further, those skilled in the art will recognize that although the credentials setting services 158, 160 and 162 are shown as being stored on client device 102, in other embodiments, the credentials setting services may be stored on another computing device where the set of executable instructions is to be executed.

Credentials setting services 156, 158 and 160 are called by credentials setting components. Specifically, credentials setting component 152 calls credentials setting service 158, and credentials settings component 154 can call either credentials setting service 160 or credentials setting service 162. In some embodiments, the credential setting component and the credential setting service are the same module, such as credential setting component/service 150. Credentials setting components 150, 152 and 154 can include compiled executables or scripts and generally receive parameters that include at least the user ID and the password to be used in setting the credentials. Additional parameters can include a path or name of the credentials setting service to be called, and a path and name of an instruction that credentials are to be set for. In embodiments where the credential setting component does not receive the path and name of the instructions that the credentials are to be set for, the credential setting component will already have that information and will often be dedicated to setting the credentials for a single instruction.

Figure 21:
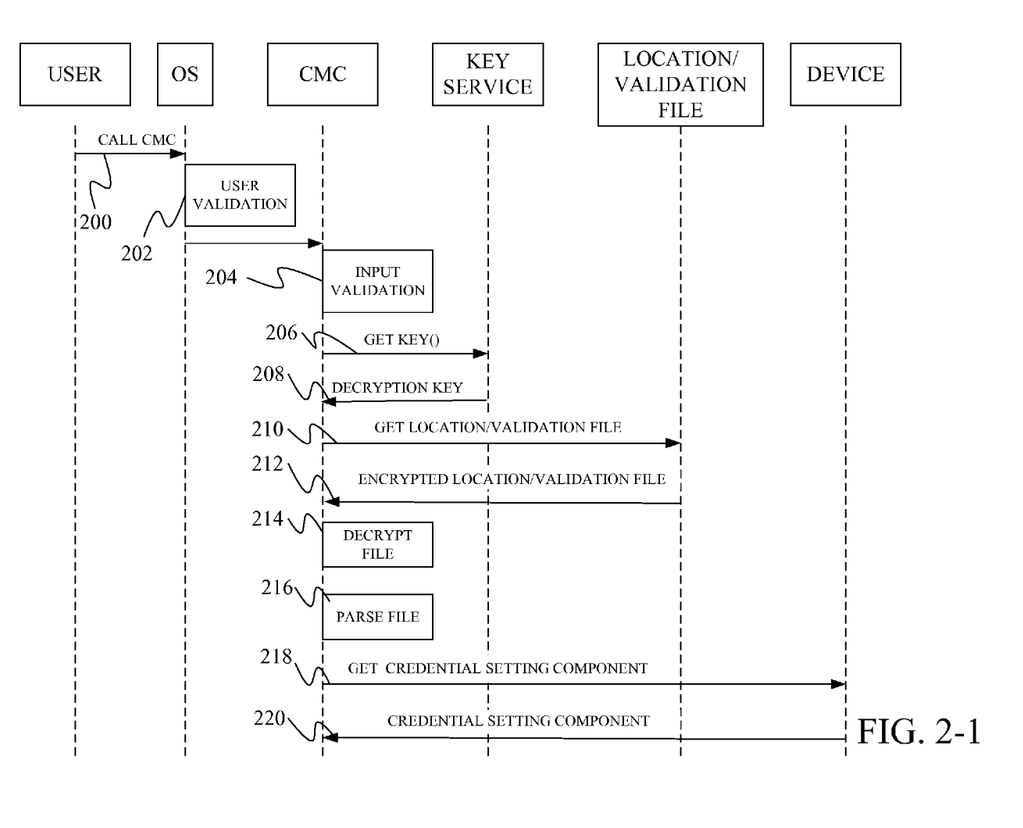

As shown in FIG. 2-1, execution begins at step 200 when a user calls credentials management client 120 through a command line instruction or script 170. At step 202, an Operating System validates the user by checking that the current user ID has permission to call credentials management client 120. If the user does not have authority to call credentials management client 120, the Operating System returns an error.

At step 204, credentials management client 120 validates input parameters passed to credentials management client 120 when the user calls credentials management client 120. According to one embodiment, the parameters include a name for the set of instructions for which credentials are being set, the credentials setting service (Service Controller (sc.exe), Auto Logon, and scripts that change the identity of an Application Pool or Virtual Directory) that is to be used to set the credentials that the instruction set will run under, and what type of device (In Store Processor, Point Of Sale system, work station, mobile, register) the set of instructions will be run on. Typically, the set of instructions will be run on the client device 102 and as such the device type will match the client device's type.

If the parameters are valid, credentials management client 120 requests a decryption key from key management service 108 through an Enterprise Key Management and Cryptography (EKMC) wrapper 176 at step 206. According to one embodiment, a single decryption key is requested that can be used to decrypt an encrypted location/validation file 172 and an encrypted credentials file 174, both of which are discussed in more detail below. In other embodiments, two separate decryption keys are requested—one that can be used to decrypt the encrypted location/validation file 172 and one that can be used to decrypt encrypted credentials file 174. According to further embodiments, a separate decryption key is provided for each location/validation file 172 and each credentials file 174.

Key management service 108 verifies that device 102 has authority to receive the decryption key(s) and at step 208 returns the decryption key(s) to credentials management client 120 where they are stored in a volatile memory that is accessible only by credentials management client 120.

At step 210, credentials management client 120 identifies a location of an encrypted location/validation file 172 and requests that encrypted location/validation file 172 be sent to client device 102. According to one embodiment, credentials management client 120 identifies the location of encrypted location/validation file 172 by determining the name of encrypted location/validation file 172 and by determining the path or location of encrypted location/validation file 172.

In accordance with one embodiment, the name of encrypted location/validation file 172 is determined in response to the parameters passed during the call to credentials management client 120. Specifically, a separate encrypted location/validation file 172 can be provided for each combination of the name of the set of instructions that is to be executed, the credentials setting service and the type of client device. The relationship between these parameters and the name of the encrypted location/validation file 172 can be written into the code of credentials management client 120 or may be stored in a secure database (not shown) that can be accessed by credentials management client 120.

The location of encrypted location/validation file 172 may be stored in a configuration file 190 on client device 102.

At step 212, the encrypted location/validation file 172 is returned to credentials management client 120, through network connection 112, for example.

At step 214, Enterprise Key Management and Cryptography (EKMC) wrapper 176 of credentials management client 120 decrypts the encrypted location/validation file 172 using the decryption key sent by Encryption Key Management Service 108. The decrypted location/validation file 178 is then stored on a storage medium on client device 102.

At step 216, decrypted location/validation file 178 is parsed to identify a credentials setting component, a stored hash value for the credentials setting component, arguments to pass when calling the credentials setting component, a credential object identifier, and, optionally, a set of valid endpoints (devices) that can be used to set the credentials for the set of instructions and a RunAs credential identifier.

Figure 3:
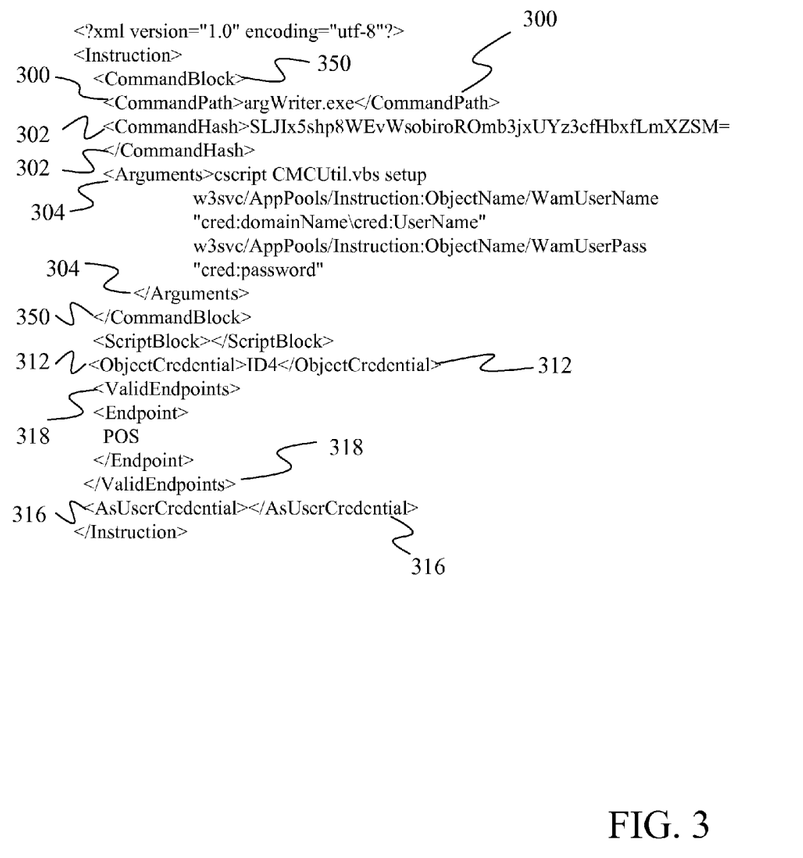
FIG. 3 shows an example layout for a location/validation file according to an embodiment.

FIG. 3 provides an example of a decrypted location/validation file 178 written in an Extensible Markup Language (XML). In FIG. 3, information about the credential setting component is found within <CommandBlock> tags 350. Specifically, the elements within <CommandBlock> tags 350 include <CommandPath> tags 300 that delimit the path for the credentials setting component, <CommandHash> tags 302 that delimit a stored hash value for the credential setting component, and <Arguments> tags 304 that delimit arguments to be passed to the credential setting component. <CommandPath> tags 300 indicate that the credentials setting component is an executable named "argWriter.exe". <Arguments> tags 304 indicate that the script "CMCUtil.vbs" is to be used as the credential setting service and is to be executed using the "cscript" host. Further, <Arguments> tags 304 indicate that "CMCUtil.vbs" is to receive arguments based on the terms:

"setup";
"w3svc/AppPools/Instruction:ObjectName/WamUserName
    "cred:domainName\cred:UserName""; and
"w3svc/AppPools/Instruction:ObjectName/WamUserPass
    "cred:password"".

These arguments indicate that "CMCUtil.vbs" is to change the identity of an application pool.

The credential object identifier, which identifies a credential object to be used when setting credentials, is stored within <ObjectCredential> tags 312. One example of a credential object is a name for a file containing encrypted credentials. In FIG. 3, the credential object identifier is "ID4". The valid devices on which the credentials may be set for the set of instructions are found within <ValidEndpoints> tags 318. In FIG. 3, only one device, a Point Of Sale (POS) device, may be used to set the credentials for the set of instructions. The RunAs credential identifier is not present in FIG. 3 as indicated by the lack of an entry between <AsUserCredential> tags 316.

Figure 4:
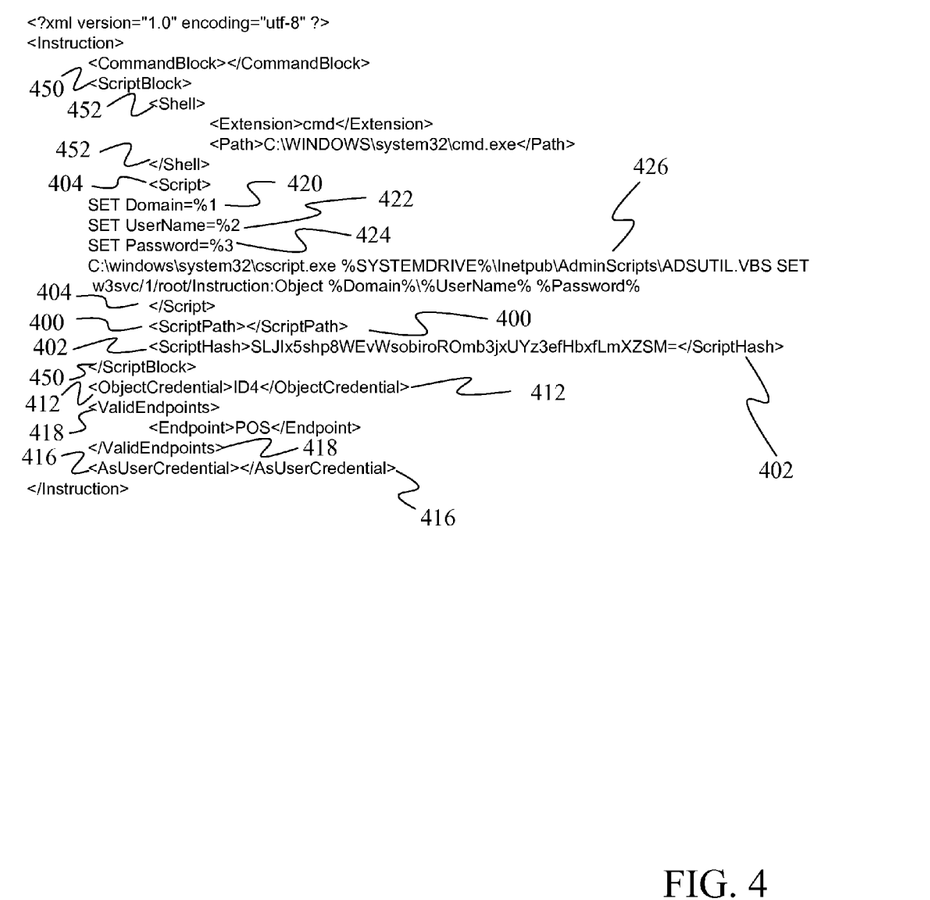
FIG. 4 shows an example layout for a location/validation file according to a second embodiment.

FIG. 4 provides a second example of a decrypted location/validation file 178 written in an Extensible Markup Language (XML). In FIG. 4, instead of referencing an executable application as the credentials setting component, the decrypted location/validation file 178 provides a script that will act as the credential setting component. Specifically, decrypted location/validation file 178 provides script elements in <ScriptBlock> tags 450 that include a shell environment in <Shell> tags 452, the actual script in <Script> tags 404, an optional script path in <ScriptPath> tags 400 and a hash value for the script in <ScriptHash> tags 402. The values within <Shell> tags 452 define a scripting environment in which the script in <Script> tags 404 should be executed. Specifically, in FIG. 4, the "cmd,exe" script host is to be used to execute the script while using the "and" extensions of the script host.

The script within <Script> tags 404 include three SET commands 420, 422 and 424 that set variables "Domain", "UserName", and "Password" to values represented by variables "1", "2" and "3", respectively. Variables "1", "2" and "3" are automatically set to the first, second and third parameters that are passed by credentials management client 120 when calling the script. The first, second and third parameters are the Domain, UserName and Password decrypted from the credential object. The <Script> tags also include an instruction to execute the credentials setting service used to set the credentials. In particular, script instruction 426 of FIG. 4 indicates that the ADSUTIL.VBS script is the credentials setting service to be executed. Script instruction 426 further indicates that ADSUTIL.VBS is to run within the "cscript.exe" script host and is to receive arguments of SET, "w3svc/1/root/Instruction:Object", "% Domain %\% UserName %", and "% Password %".

During execution, credentials management client 120 writes this script to a file and executes the file using the shell defined in <Shell> tags 452. While writing the script to the file, credentials management client 120 replaces "Instruction: Object" with the instruction for which the credentials are being set. The path of the file that the script is written to may be defined within the <ScriptPath> tags 400. If no path is provided, as is shown in FIG. 4, credentials management client 120 generates a random name for the file and stores the script within the file. After the script has executed, the file containing the script is deleted. If the same decrypted location/validation file 178 is used again, a different random name is generated for the file. This technique helps to reduce the risk that the file containing the script will be hijacked.

The <ScriptHash> tags 402 contain a hash value for the file containing the written script. Thus, after the script is written to the file, a hash of that file should produce the hash value found in <ScriptHash> tags 402.

In FIG. 4, the credential object identifier, which identifies a credential object to be used when setting credentials, is stored within <ObjectCredential> tags 412. One example of a credential object is a name for a file containing encrypted credentials. The RunAs credential identifier is not present in FIG. 4 as indicated by the lack of an entry between <AsUserCredential> tags 416. The valid devices on which the credentials may be set for the set of instructions are found within <ValidEndpoints> tags 418. In FIG. 4, only one device, a Point Of Sale (POS) device, may be used to set the credentials for the set of instructions.

Figure 5:
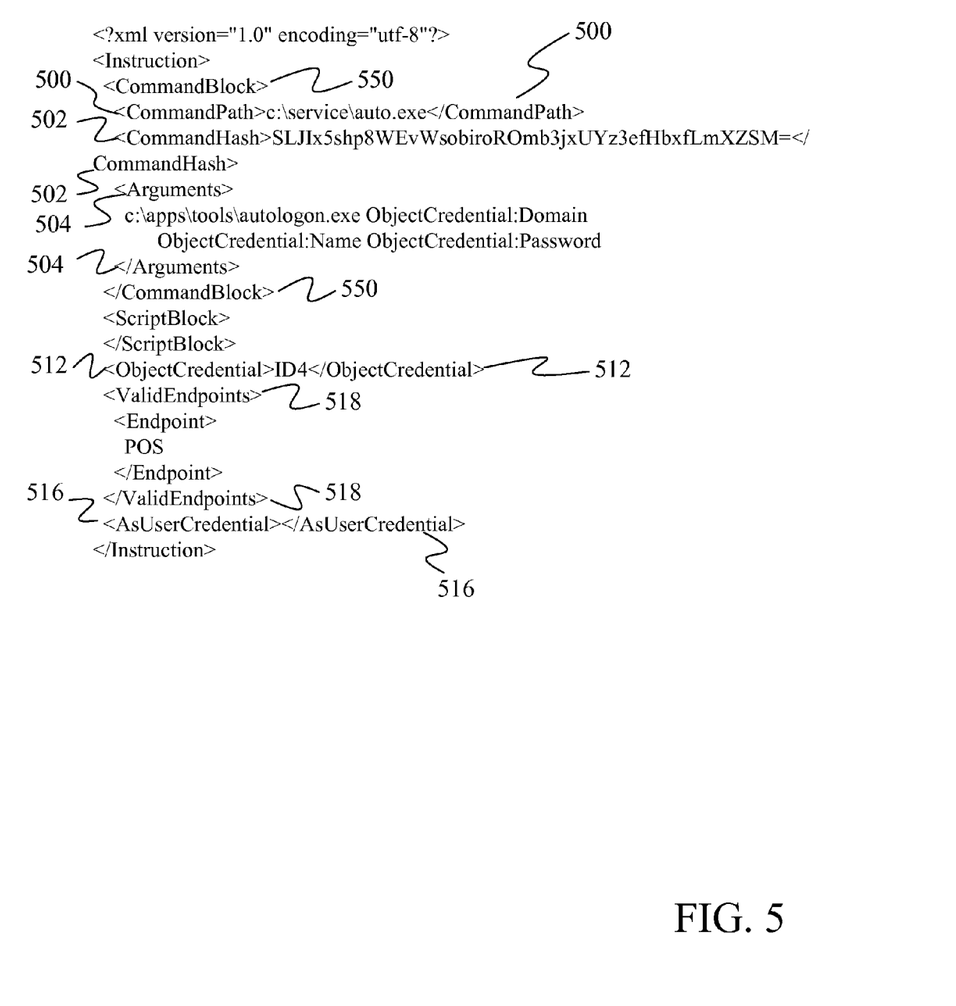
FIG. 5 shows an example layout for a location/validation file according to a third embodiment.

FIG. 5 provides a third example of a decrypted location/validation file 178 written in an Extensible Markup Language (XML). In FIG. 5, information about the credential setting component is found within <CommandBlock> tags 550. Specifically, the elements within <CommandBlock> tags 550 include <CommandPath> tags 500 that delimit the path for the credentials setting component, <CommandHash> tags 502 that delimit a stored hash value for the credential setting component, and <Arguments> tags 504 that delimit arguments to be passed to the credential setting component.

As found within <CommandPath> tags 500, the path for the credentials setting component is "c:\service\auto.exe". As found within <Arguments> tags 504, the arguments to pass when calling the credentials setting component are based on the identity of the credential setting service as "c:\apps\tools\autologon.exe", and the Domain, UserName and Password from the credential object, which are listed as "ObjectCredential:Domain", "ObjectCredential:Name", and "ObjectCredental:Password." Thus, the arguments of FIG. 5 indicate that the Auto Logon service is to be used to set the credentials. The credential identifier, which identifies a credential object to be used when setting credentials, is stored within <ObjectCredential> tags 512. One example of a credential object is a name for a file containing encrypted credentials. . The RunAs credential identifier is not present in FIG. 5 as indicated by the lack of an entry between <AsUserCredential> tags 516. The valid devices on which the credentials may be set for the set of instructions are found within <ValidEndpoints> tags 518. In FIG. 5, only one device, a Point Of Sale (POS) device, may be used to set the credentials for the set of instructions.

Figure 6:
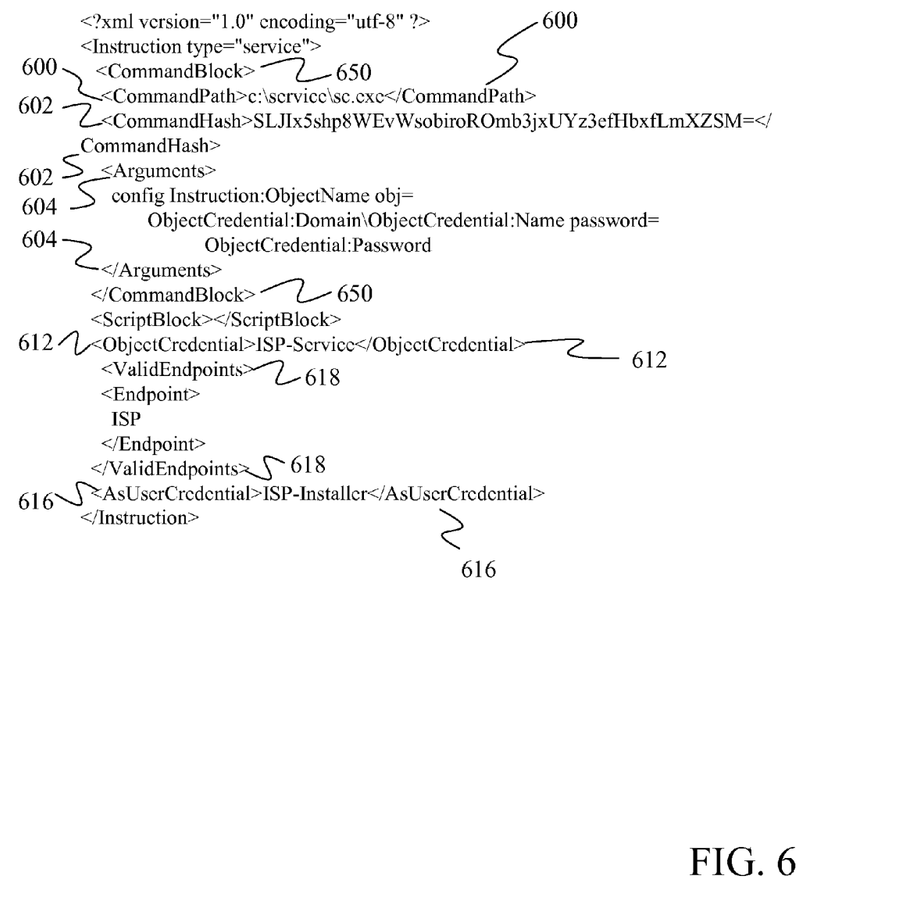
FIG. 6 shows an example layout for a location/validation file according to a fourth embodiment.

FIG. 6 provides a fourth example of a decrypted location/validation file 178 written in an Extensible Markup Language (XML). In FIG. 6, information about the credential setting component is found within <CommandBlock> tags 650. Specifically, the elements within <CommandBlock> tags 650 include <CommandPath> tags 600 that delimit the path for the credentials setting component, <CommandHash> tags 602 that delimit a stored hash value for the credential setting component, and <Arguments> tags 604 that delimit arguments to be passed to the credential setting component.

As found within <CommandPath> tags 600, the path for the credentials setting component is "c:\service\sc.exe". As found within <Arguments> tags 604, the arguments to pass when calling the credentials setting component are based on a "config" parameter, an "Instruction: Object Name" parameter, an "obj=ObjectCredential:Domain\ObjectCredential: Name" parameter and a "password=ObjectCredential:Password" parameter. In <Arguments> tags 604, a credential setting service is not listed. This occurs because the credential setting component "c:\service\sc.exe" also acts as the credential setting service.

The credential identifier, which identifies a credential object to be used when setting credentials, is stored within <ObjectCredential> tags 612. One example of a credential object is a name for a file containing encrypted credentials. The RunAs credential identifier is "ISP-Installer" in FIG. 6 as indicated between <AsUserCredential> tags 616. The valid devices on which the credentials may be set for the set of instructions are found within <ValidEndpoints> tags 618. In FIG. 6, only one device, an In Store Process (ISP), may be used to set the credentials for the set of instructions.

Figure 22:
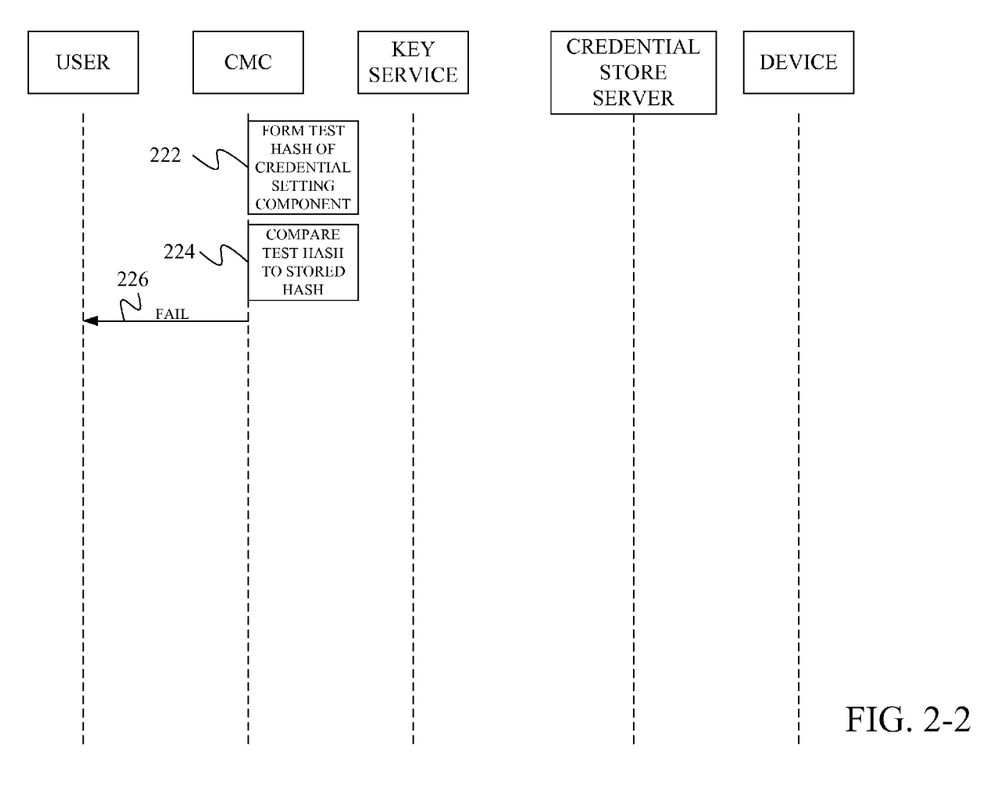

At step 218, credentials management client 120 obtains the file containing the credentials setting component. In order request the file, credentials management client 120 must know the path of the file. For decrypted location/validation files 178 that have entries between <CommandBlock> tags, the path of the file is found within the <CommandPath> tags. For decrypted location/validation files 178 that have entries between <ScriptBlock> tags instead of between <CommandBlock> tags, the path of the file containing the credentials setting component is generated by credentials management client 120. Specifically, upon determining that there is script between the <Script> tags of the decrypted location/validation file 178, credential management client 120 creates a file with a random name and writes the script from the <Script> tags to the file. The created file thus becomes the credentials setting component. Credentials management client 120 may keep the created file open after writing the script to it or may close the file.

If credentials management client 120 does not have the credentials setting component open, credentials management client 120 request the credentials setting component (such as component 150, 152, or 154) from client device 102 at step 218. After the credentials setting component is returned at step 220, credentials management client 120 forms a computed or test hash value of the credentials setting component at step 222. Such a test hash value may be computed through any known hash computation technique that provides a hash value that is based on the contents of the credentials setting component. Note that although requesting the credentials setting component, receiving the credentials setting component and forming a hash of the credentials setting component are shown as separate steps, in some embodiments, these steps may be achieved by calling a hashing application while passing the path of the credentials setting component to the hashing application.

At step 224, credentials management client 120 compares the computed/test hash value from step 222 to a stored hash value found in decrypted location/validation file 178. For example, for the decrypted location/validation files 178 of FIGS. 3-6, the computed/test hash is compared to the stored hash value found between either the <CommandHash> tags or the <ScriptHash> tags.

If the hash values do not match (are not the same) the process ends in failure at step 226. If there is no stored hash value, a warning is returned but the process continues.

If the hash values match, credentials management client 120 requests encrypted credential files 174 from credential store server 104 at step 238. Encrypted credential files 174 are generated by Password Vault 106 and are encrypted by EKMC wrapper 180. Encrypted credential files 174 include one set of credentials that includes a Domain, a User ID, and a password. Password Vault 106 periodically alters or changes the password corresponding to the User ID through an automated process. When this occurs, Password Vault 106 forms a new encrypted credential file 174 and erases the previous encrypted credential file 174. During encryption, EKMC wrapper 180 uses an encryption key received from Key Management Service 108 that is associated with the decryption key provided to credentials management client 120. According to one embodiment, Password Vault 106 is in communication with Key Management Service 108 through a network 114.

To request encrypted credentials file 174, credentials management client 120 constructs the location of encrypted credentials file 174 based on the path to credentials store server 104 (taken from configuration file 190), the name of credentials store server 104 (taken from configuration file 190), the device type (received in the call to credentials management client 120 at step 200) and the name of the encrypted credentials file 174 retrieved from the ObjectCredential tags of the decrypted location/validation file 178.

Figure 23:
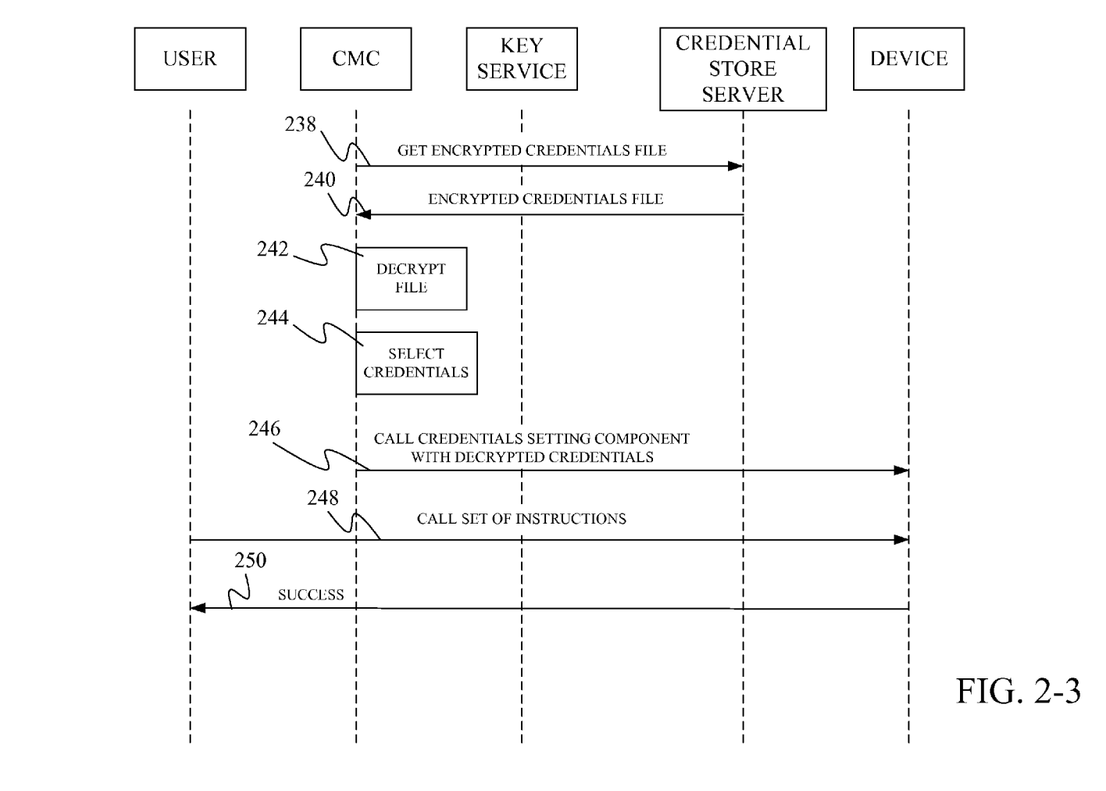

After the encrypted credentials file 174 is received at step 240, it is decrypted by EKMC wrapper 176 at step 242 using the decryption key that was retrieved at step 208. Note that before performing decryption step 242, the process of FIG. 2 requires that the test hash value and the stored hash value for the credentials setting component match each other at step 224.

If decryption step 242 is successful, the decrypted credentials file 182 is stored in volatile memory on client device 102. According to many embodiments, decrypted credential file 182 is not stored in non-volatile memory to reduce the likelihood that the credentials could be discovered.

At step 244, credentials management client 120 selects a set of credentials to run under. Specifically, if the <AsUserCredential> tag has a User ID, credentials management client 120 runs under that User ID when it calls the credentials setting component. If the <AsUserCredential> does not have a User ID, credentials management client 120 runs under the User ID that called credentials management client 120.

At step 246, the credentials setting component identified in decrypted location/validation file 178 or identified within the code of credentials management client 120, is called with the decrypted credentials 182. For embodiments that utilize script code from the decrypted location/validation file 178 to form the credentials setting component, as in FIG. 4, the credentials setting component is called with the Domain, UserName and Password of decrypted credentials 182 sent as arguments. For embodiments that use a command in a command block of decrypted location/validation file 178, the arguments found in decrypted location/validation file 178, such as the arguments between the <Arguments> tags of FIGS. 3, 5 and 6 are submitted to the credential setting component. For example, the Arguments 304 of FIG. 3 would be submitted to the credential setting component with the domain of decrypted credentials 182 inserted in place of "cred:domain", the User of decrypted credentials 182 inserted in place of "cred:UserName", the password of decrypted credentials 182 inserted in place of "cred:password" and the instruction for which the credentials are being set inserted in place of "Instruction:Object". In the example of FIG. 5, the domain of decrypted credentials 182 is inserted in place of "ObjectCredential:Domain", the User of decrypted credentials 182 is inserted in place of "ObjectCredential:Name", and the password of decrypted credentials 182 is inserted in place of "ObjectCredential:password" when the arguments in <Arguments> tags 504 are submitted to the credential setting component. In the example of FIG. 5, the set of instructions for which the credentials are being set are already known to the credential setting component. In the example of FIG. 6, the domain of decrypted credentials 182 is inserted in place of "ObjectCredential:Domain", the User of decrypted credentials 182 is inserted in place of "ObjectCredential:Name", the password of decrypted credentials 182 is inserted in place of "ObjectCredential:password" and the instruction for which credentials are being set is inserted in place of "Instruction:Object" when the arguments in <Arguments> tags 604 are submitted to the credential setting component. The credential setting components can be, for example, one of credentials setting components 150, 152, and 154.

At step 248, after the called credentials setting component has successfully set the credentials under which the set of instructions will be run, the set of instructions can be called. After the set of instructions execute, the process of FIGS. 2-1, 2-2 and 2-3 ends at step 250.

System 100 may be used in a retail environment consisting of one or more store locations. Each store location can have one or more client devices 102 such as In Store Processors, Point of Sale systems, workstations, mobile devices, and/or registers. In large retail environments, a large number of different store locations are connected to one or more remote servers by a computer network. In some retail systems, the servers are located within one or more regional, national or international headquarters. In such large retail environments, there may be a single credential store server, key management service and password vault that is used by all of the client devices in all of the store locations. In other large retail environments, multiple different credential store servers, key management services and password vaults will be provided. In large retail environments, the set of instructions executed by the client devices 102 may interact with one or more servers located within the same store location as the client device 102, or may interact with one or more servers located at a remote location such as another store location, a server farm, or a regional, national or international headquarters. These additional servers can include database servers, files servers and other types of servers.

Figure 7:
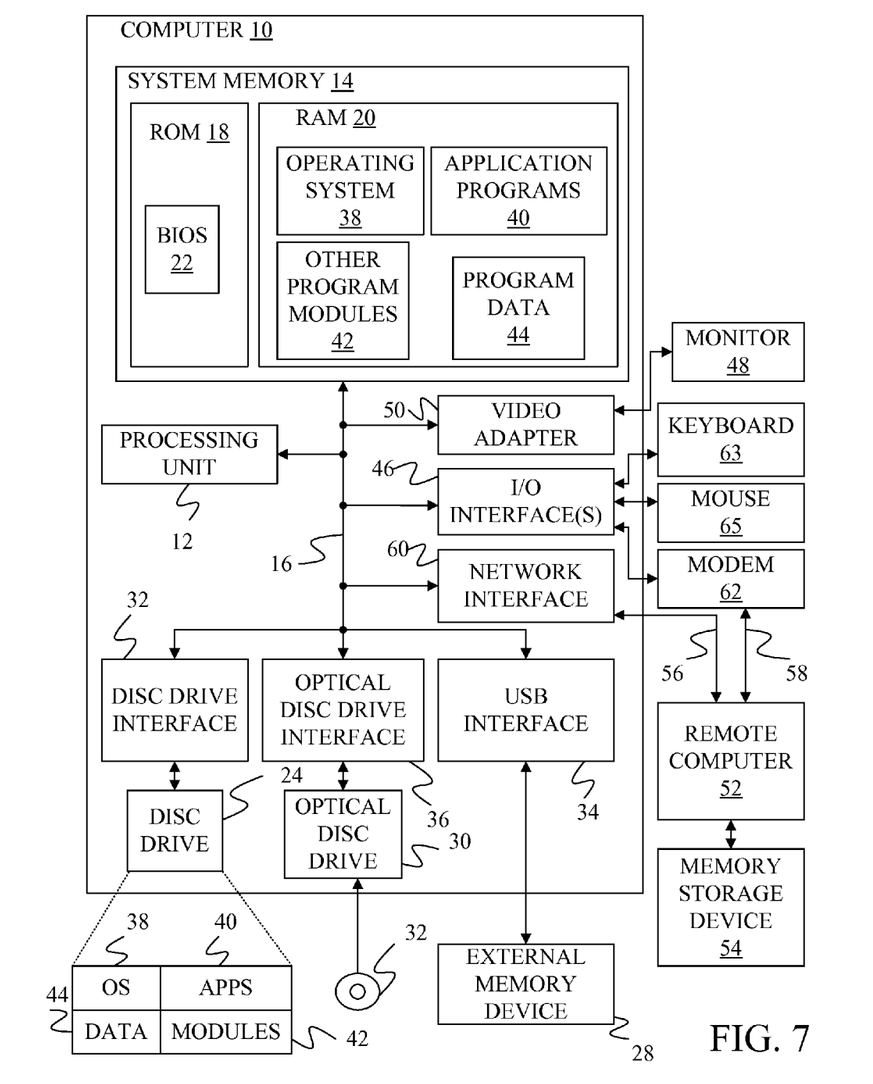
FIG. 7 is a block diagram of a computing environment according to one embodiment.

An example of a computing device that can be used as a server and/or client device in the various embodiments is shown in the block diagram of FIG. 7. The computing device 10 of FIG. 7 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the personal computer 10, is stored in ROM 18.

Embodiments of the present invention can be applied in the context of computer systems other than personal computer 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computer 10 further includes a hard disc drive 24, an external memory device 28, and an optical disc drive 30. External memory device 28 can include an external disc drive or solid state memory that may be attached to computer 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the personal computer 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include the credentials management client, credentials setting component, executable instructions, credentials setting services, and EKMC wrapper, discussed above and program data 44 may include data stored in any of the databases or lists discussed above including the encrypted credential files, encrypted location/validation files, decryption keys, decrypted applications, and decrypted credentials.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The personal computer 10 may operate in a network environment utilizing connections to one or more remote computers, such as a remote computer 52. The remote computer 52 may be a server, a router, a peer device, or other common network node. Remote computer 52 may include many or all of the features and elements described in relation to personal computer 10, although only a memory storage device 54 has been illustrated in FIG. 7. The network connections depicted in FIG. 7 include a local area network (LAN) 56 and a wide area network (WAN) 58. Such network environments are commonplace in the art.

The personal computer 10 is connected to the LAN 56 through a network interface 60. The personal computer 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the personal computer 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 7 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer storage medium having computer executable instructions that when executed by a processor cause the processor to perform steps comprising:
   decrypting an encrypted file to gain access to a stored hash value for a credentials setting component;
   forming a test hash value of the credentials setting component based on contents of the credentials setting component;
   requiring that the test hash value of the credentials setting component match the stored hash value of the credentials setting component before decrypting a set of encrypted credentials to form decrypted credentials, the decrypted credentials including a domain, a user ID, and a password; and
   passing the decrypted credentials to the credentials setting component to set credentials that instructions are to be executed under, the instructions being one of a plurality of executable instructions for which the credentials are set such that each of the plurality of executable instructions is run under unique set credentials.

2. The non-transitory computer storage medium of claim 1 further comprising retrieving the encrypted file in response to at least a received name for a credentials setting service that is to be called by the credentials setting component.

3. The non-transitory computer storage medium of claim 2 wherein retrieving the encrypted file comprises retrieving the encrypted file in further response to at least a received name for a set of instructions that are to be executed under the decrypted credentials.

4. The non-transitory computer storage medium of claim 1 wherein decrypting the encrypted file gives access to a name of a file containing the set of encrypted credentials.

5. The non-transitory computer storage medium of claim 1 wherein decrypting the encrypted file gives access to at least one argument to be passed to the credential setting component.

6. The non-transitory computer storage medium of claim 5 wherein decrypting the encrypted file gives access to a RunAs credential identifier that provides a credential under which the credential setting component is called.

7. The non-transitory computer storage medium of claim 1 further comprising calling the instructions after the credentials setting component has set the credentials that the instructions are to be executed under.

8. The non-transitory computer storage medium of claim 4 further comprising constructing a location for the file containing the set of encrypted credentials using the name of the file containing the encrypted credentials, a path for a credential store server, a name for the credential store server and a device type for a device the set of instructions will be executed upon.

9. The non-transitory computer storage medium of claim 1 wherein the set of encrypted credentials comprise at least one password that is periodically changed through an automated process.

10. A method comprising:
    identifying a location of a credentials setting component;
    determining a computed hash value of the credentials setting component based on contents of the credentials setting component;
    using a processor to compare the computed hash value of the credentials setting component at the location to a stored hash value for the credentials setting component;
    requiring that the stored hash value for the credentials setting component and the computed hash value for the credentials setting component be the same before decrypting a set of encrypted credentials to form a set of decrypted credentials, the decrypted credentials including a domain, a user ID, and a password;
    periodically altering the contents of the credentials automatically and forming a new set of encrypted credentials; and
    passing the set of decrypted credentials to the credentials setting component to set credentials that instructions are to be executed under, the instructions being one of a plurality of executable instructions for which the credentials are set such that each of the plurality of executable instructions is run under unique set credentials.

11. The method of claim 10 wherein identifying the location of the credentials setting component comprises decrypting a file comprising the location of the credentials setting component.

12. The method of claim 11 wherein the file further comprises the stored hash value for the credentials setting component.

13. The method of claim 12 wherein the file further comprises a file name for an encrypted credentials file comprising the set of encrypted credentials.

14. The method of claim 11 further comprising identifying a location of the file using a name for a set of instructions to be executed under the decrypted credentials and a name for a credentials setting service that is to be called by the credentials setting component.

15. The method of claim 12 wherein the file further comprises a RunAs credential identifier.

16. A computing system comprising:
    a hardware processor programmed to include a credentials setting component, the credentials setting component is software configured to perform steps comprising setting credentials under which instructions may be executed, the instructions being one of a plurality of executable instructions for which the credentials are set such that each of the plurality of executable instructions is run under unique set credentials; and
    a credentials management client that performs steps comprising:
      decrypting an encrypted file to obtain a name of an encrypted credentials file;
      verifying that the credentials setting component has not been modified using a hash computation;
      periodically altering contents of the credentials and forming a new encrypted credentials file;
      decrypting the new encrypted credentials file to obtain a password; and
      providing a user ID and the password to the credentials setting component.

17. The computing system of claim 16 further comprising a credential server and a key service, wherein the credentials management client retrieves the encrypted file from the credential server and retrieves a key from the key service and wherein the credentials management client decrypts the encrypted file using the retrieved key.

18. The computing system of claim 17 wherein the location of the encrypted credentials file is on the credential server.

19. The computing system of claim 16 further comprising executable instructions that are executed under the user ID and the password provided to the credentials setting component.

* * * * *